April 10, 1951 W. L. SMITH 2,547,984
SELECTIVITY SWITCHING DEVICE
Filed April 1, 1946
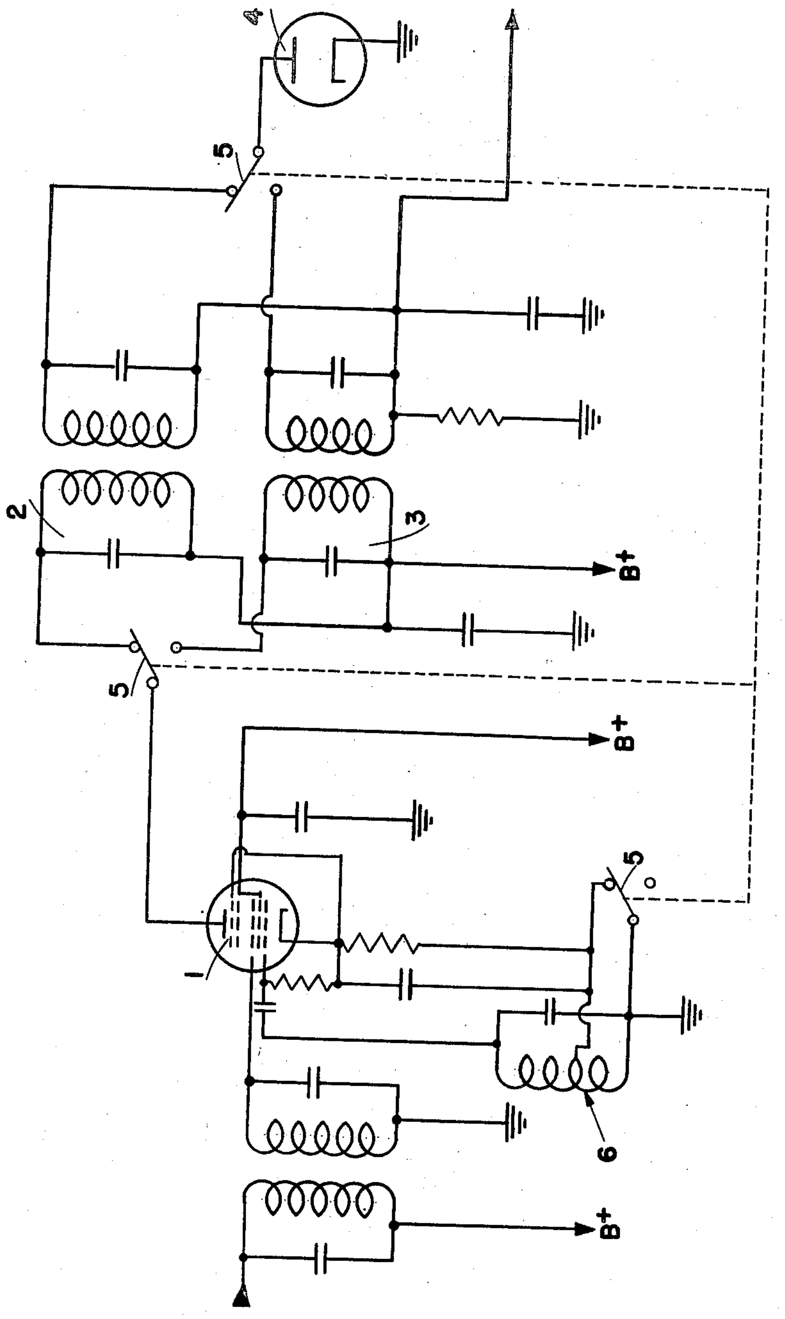
INVENTOR.
WILLIAM L. SMITH
BY
ATTORNEY Patented Apr. 10, 1951

2,547,984

UNITED STATES PATENT OFFICE 2,547,984

SELECTIVITY SWITCHING DEVICE

William L. Smith, Silver Spring, Md.

Application April 1, 1946, Serial No. 658,723

1 Claim. (Cl. 250—20)

(Granted under the act of March 3, 1883, as amended April 30, 1928; 370 O. G. 757)

My invention relates to radio receivers and more particularly to selectivity switching devices.

It has been the practice in this art to use a plurality of intermediate frequency amplifiers having different bandwidths. My invention uses a switching device whereby any one of a plurality of intermediate frequency signals, each providing a particular bandwidth, is selected. It eliminates extensive duplication of components and the difficulty encountered in the design of intermediate frequency amplifiers operating on identical frequencies and having widely different bandwidths. Also in my invention a minimum of components is required, and the difference between bandwidths may be as great as desired.

In accordance with my invention, any one of a plurality of bandwidths is obtained in a radio receiver in accordance with the position of the selectivity switch.

Further in accordance with my invention, one switch position embodying one degree of selectivity is used for the reception of one type of wave; and the other positions, each embodying a different degree of selectivity, are used for the reception of other types of waves (for example, a narrow bandwidth is used for a very stable transmitted wave, and a wide bandwidth used for an unstable transmitted wave).

My invention further resides in systems having features hereinafter described and claimed.

For an understanding of my invention and for illustration of examples thereof, reference is made to the accompanying drawing, in which:

The drawing is a circuit diagram of a vacuum tube, its accompanying circuit, and output transformers.

In the drawing, a signal (for example, a 10 megacycle signal) from the penultimate intermediate frequency amplifier is fed into the input of tube 1. The initial stages of the receiver up to this tube follow the conventional design of an amplitude modulated receiver and are designed for the wider of the two bandwidths desired (for example, 150 kilocycles). However, my invention is not limited to a case where only two bandwidths are used or where an amplitude modulated receiver is used, but includes also a system where a plurality of bandwidths are used and where receivers of any known type of modulation are used. The last intermediate frequency amplifier of a standard receiver is replaced by a converter tube in my invention with two output transformers 2, 3 provided for this stage: one 10 megacycle transformer for the wide band and a low frequency transformer (say, 460 kilocycles) for the sharper band of 15 kilocycles. In a radio, the bandwidth of the receiver is dependent on the fundamental intermediate frequency and on the Q of the tuning coils. Since the Q of resonance-tuned coils does not vary greatly with frequency (of the range used in this invention, 460 kilocycles-10 megacycles), the bandwidth is said to be mainly dependent on the fundamental intermediate frequency. For example, a high intermediate frequency has a broad bandwidth, and a lower intermediate frequency has a narrower bandwidth for the same percentage drop in signal voltage. In the grid circuit is provided an oscillator tank circuit 6 tuned to the sum or difference of the two intermediate frequencies and arranged so that it is disabled when the high intermediate frequency output transformer 2 is selected. The tube 1 operates as an amplifier in the broad bandwidth position passing through the 10 megacycle signal, and as a superheterodyne converter in the sharp position mixing the tank circuit signal of 10 megacycles±460 kilocycles, with the 10 megacycle input signal to give a signal of frequency 460 kilocycles, requiring the narrow bandwidth of 15 kilocycles. The switching selection is controlled manually as desired, with the switches 5 acting simultaneously. The output signals of 10 megacycles and 460 kilocycles are fed either through more amplifier stages first or directly to the diode detector 4 and on to the video circuits of the radio receiver.

The invention described herein may be manufactured and used by or for the Government of the United States of America for governmental purposes without the payment of any royalties thereon or therefor.

What is claimed is:

In a superheterodyne radio receiver producing a first predetermined intermediate frequency, a selectivity switching device comprising an input circuit responsive to said first predetermined intermediate frequency, a multi-element vacuum tube comprising an amplifying section and an oscillator section, means connecting said amplifying section of said vacuum tube to said input circuit, an oscillator circuit including a tuned tank circuit tuned to a predetermined heterodyne frequency adapted to be connected to said oscillator circuit whereby to cause said vacuum tube to produce a second predetermined intermediate frequency equal to the difference between said first predetermined intermediate frequency and said predetermined heterodyne frequency, first tuned output circuit means responsive to said first predetermined intermediate frequency, second tuned output circuit means responsive to said second predetermined intermediate frequency, and two position switch means adapted in one position to connect said second output circuit to said vacuum tube and to connect said oscillator circuit to the oscillator section of said vacuum tube and adapted in the other position to disconnect said oscillator circuit from said oscillator section of said vacuum tube and to connect said first output circuit to said vacuum tube, whereby to selectively produce two distinct band widths from said receiver.

WILLIAM L. SMITH.

REFERENCES CITED

The following references are of record in the file of this patent:

UNITED STATES PATENTS

| Number | Name | Date |
|---|---|---|
| 2,022,805 | Farnham | Dec. 3, 1935 |
| 2,047,653 | Stone | July 14, 1936 |
| 2,155,126 | Goldmark | Apr. 18, 1939 |
| 2,167,605 | Carlson | July 25, 1939 |
| 2,186,455 | Goldmark | Jan. 9, 1940 |